United States Patent

Freeman

[11] 3,807,517
[45] Apr. 30, 1974

[54] LEAF SPRING SCALE
[75] Inventor: Gerald C. Freeman, Norwalk, Conn.
[73] Assignee: Pitney-Bowes, Inc., Stamford, Conn.
[22] Filed: Dec. 26, 1972
[21] Appl. No.: 318,546

[52] U.S. Cl............... 177/169, 177/164, 177/168, 177/171, 177/177, 177/225, 177/229, 177/234
[51] Int. Cl............................................. G01g 23/14
[58] Field of Search.................... 177/168–170, 177/229–231, 212, 246, 195, 225, 177–178; 73/67, 100, 141 A

[56] References Cited
UNITED STATES PATENTS

| | | | |
|---|---|---|---|
| 3,443,653 | 5/1969 | Marshall | 177/169 |
| 3,602,325 | 8/1971 | Ast et al. | 177/169 |
| 3,047,084 | 7/1962 | Vogel | 177/229 |
| 3,347,328 | 10/1967 | Schiesler et al. | 177/229 |
| 1,993,577 | 3/1935 | Von Pein | 177/169 X |
| 2,969,228 | 1/1961 | Appius | 177/229 |
| 2,681,222 | 6/1954 | Stelzer | 177/168 |
| 1,540,298 | 6/1925 | White | 177/229 X |

Primary Examiner—Richard B. Wilkinson
Assistant Examiner—Vit W. Miska
Attorney, Agent, or Firm—William D. Soltow, Jr.; Albert W. Scribner; Martin D. Wittstein

[57] ABSTRACT

A leaf spring weighing device is described for accurate weighing of a load. A tare structure is employed which utilizes a scale deflection indicator which is operatively located at a predetermined position to render the scale substantially free from torsional effects of the tare structure due to shifts of a load on the platform of the tare structure. The scale is aligned with a level to orient the leaf springs at a predetermined tare angle to minimize non-linear leaf spring deflections and is further aligned with a pair of suitably located and operatively oriented adjustable springs to obtain a desired spring rate throughout the dynamic range of the scale. One adjustable spring is selectively anchored to adjust the full load deflection of the tare structure and also to control mid-range deviations of the scale. An accurate spring scale which is substantially free from hysteresis effects and temperature changes within a particular range is described.

19 Claims, 9 Drawing Figures

LEAF SPRING SCALE

FIELD OF THE INVENTION

This invention relates to a weighing scale. More specifically, this invention relates to a weighing scale using leaf springs to weigh a load.

BACKGROUND OF THE INVENTION

Leaf spring scales have been well-known for many years. Note for example the early 1867 U.S. Pat. to Shaler No. 66,524. In this patent a pair of parallel mounted leaf springs support a weighing frame whose deflection produces an indication of the weight of a load. In a more recent U.S. Pat. No. 2,646,274 by Weckerly, a leaf spring weighing scale is described utilizing pairs of oppositely cantilevered leaf springs to enable the weighing frame to deflect along a straight path. The increased number of springs employed in the Weckerly scale increases costs and results in a feature of little practical value.

In the U.S. Pat. to Stelzer No. 2,681,222 a leaf spring weighing scale is described wherein balancing weights are used to counterbalance the spring deflection and obtain an indication of the weight of the load. Another leaf spring scale is shown in the U.S. Pat. to White No. 1,540,298. In this latter scale a pair of leaf springs support a weighing frame or scale pan which is mechanically connected to a scale indicator arm to register the weight of the load. A yoke which is connected to the weighing frame passes rearwardly between the leaf springs for connection to the scale indicator arm.

Another leaf spring weighing scale is described in the U.S. Pat. to Vogel No. 3,047,084. In the Vogel scale, an extensive and complex tare structure is described. The leaf springs are wide and inclined at a tare angle relative to a horizontal plane. A zero positioning spring and other spring compensation elements are described. The deflection of the tare structure causes a rotation of a dial.

A leaf spring scale for ordinary postage use must be capable of a high degree of accuracy and yet be of relatively convenient structure to enable its use at a wide variety of places with a minimum of upkeep. A typical required accuracy is of the order of about one part in 1,500. Such accuracy imposes rigid standards on scales and complex compensating elements have been employed to achieve the desired accuracies.

One source of scale indicating errors can be traced to scale indicators which are mechanically driven by the leaf springs such as described in the U.S. Pat. to Vogel No. 3,047,084. It has been proposed, as for example described in the U.S. Pat. to Bell No. 3,130,802, to utilize an optical scale read-out device.

Leaf spring scales present weighing errors which are not readily compensated for. For example, a leaf spring tare structure encounters deflection errors from hysteresis effects in the leaf springs, from longitudinal rotational movements of the tare structure due to front to aft or vice versa shifts of the load to be weighed, and from lateral tare structure rotations due to side to side load shifts. Leaf spring scales also require in-situ adjustments by which the scale's deflection characteristics are adjusted to compensate for manufacturing variations of components, local variations of gravity forces and environmental effects such as vibration and temperature changes.

SUMMARY OF THE INVENTION

In a leaf spring weighing scale in accordance with the invention, the working elements of the scale are carefully selected and mounted to one another in a predetermined manner to reduce scale deflection errors and provide a highly accurate scale suitable for use in weighing postage. A leaf spring scale in accordance with the invention, has a simple yet highly accurate structure capable of performing in a reliable manner throughout a diverse range of environmental conditions.

As described with regard to a preferred embodiment of a leaf spring scale in accordance with the invention, a tare structure is formed with a pair of cantilevered mounted leaf springs. The leaf springs extend from a support frame in cantilevered fashion for connection to a weighing frame. The weighing frame supports a platform for holding a load to be weighed and thus deflect the leaf springs in proportion to the weight of the load.

A scale deflection indicator is mounted to the weighing frame and operatively so located that deflection errors caused by lateral or longitudinal load shifts on the platform have little effect. The leaf springs have an extended lateral width to form a sturdy tare structure with a low tendency to deflect in response to longitudinal or lateral shifts of the load on the platform. The tare structure further employs the leaf springs at an inclination selected to place the zero-load and maximum-load scale positions of the weighing frame in a common vertical plane for a more constant spring rate over the dynamic range of the scale.

The leaf spring scale's reduced sensitivity to load shifts is obtained by placing a scale weight indicator at such a location that the tare structure rotational movements, other than the normal deflections for weighing, have little effect upon the scale indicator. The scale weight indicator is optically readable with an optical sensor which is operatively oriented to cooperate with the scale deflection indicator for minimum sensitivity to tare structure rotation. A magnified display of the scale deflection is projected on a display screen to provide a clear and accurate indication of the weight measured by the scale.

The weighing device employs convenient scale adjustments with which the scale deflection curve is adjusted for local as well as component variations. A vertically oriented zero scale position determining spring and a generally horizontally inclined spring to determine the maximum load position of the scale are provided in conjunction with a bubble level to align the scale. The scale adjustments may be conveniently carried out in a rapid manner.

It is, therefore, an object of the invention to provide a leaf spring weighing device of high accuracy with reduced sensitivity to load shifts. It is a further object of the invention to provide a conveniently installed leaf spring weighing scale with a simple and practical structure suitable for accurate weighing at many locations under diverse environmental conditions.

BRIEF DESCRIPTION OF DRAWINGS

These and other objects and advantages will be understood from the following description of a preferred embodiment of a leaf spring weighing scale in accordance with the invention and described in conjunction with the drawings wherein.

DETAILED DESCRIPTION OF EMBODIMENT

Figure 1:
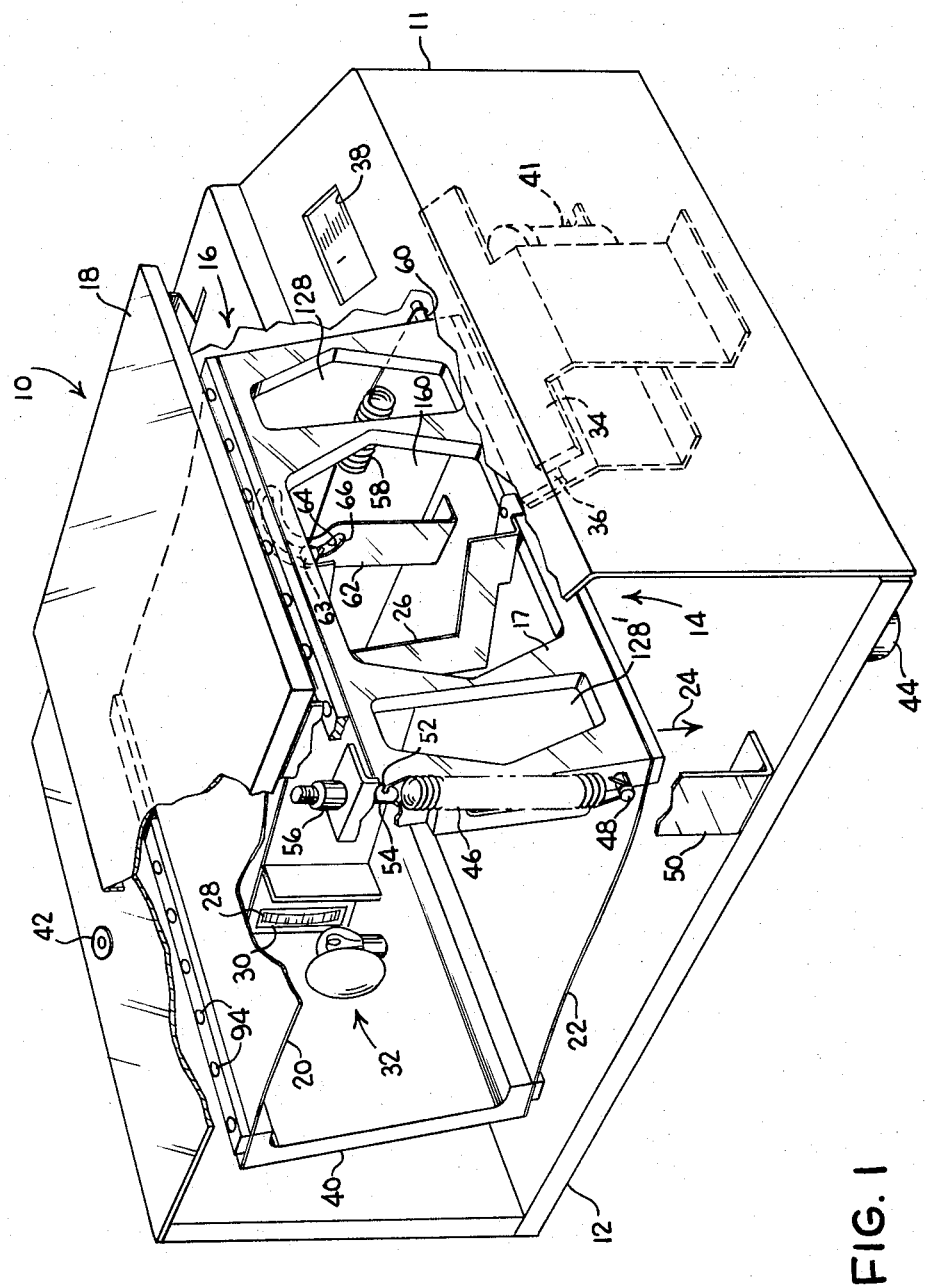
FIG. 1 is a perspective broken-away view of a leaf spring weighing device in accordance with the invention.

With reference to FIG. 1, a weighing device 10 is shown in a housing 11 which includes a stationary support frame 12 for a tare structure 14 mounted to support frame 12. Tare structure 14 includes a weighing frame 16 formed of a rigid plate 17 and a platform 18 on which loads such as envelopes and parcels are placed for weighing. The weighing frame 16 is supported by a pair of laterally wide equally sized leaf springs 20, 22 which deflect in the direction of arrow 24 when a load is placed on platform 18. A scale deflection indicator 26 is centrally mounted to plate 17 and extends rearwardly between leaf springs 20, 22 to place optically detectable scale indications 28 on a reticle 30 in sensing position with an optical read-out device 32. Read-out device 32 produces an optical beam 33 (see FIG. 2) which, after reflections by mirrors 34 and 36, is focused (beam 124) on the back side of a translucent display screen 38 located at the front of support frame 12. Leaf springs 20, 22 extend in a cantilever fashion from a stationary leaf spring frame 40 for connection at their cantilevered end to weighing frame 16. A conventional dash pot 41 is connected to weighing frame 16 to dampen oscillations.

A bubble level 42 is located on support frame 12 and is so oriented that when its bubble is centered, by adjusting the height of three support feet such as 44, leaf springs 20 and 22 are properly inclined at a predetermined tare angle $\theta$ relative to a horizontal plane. As will be further described, this tare angle $\theta$ locates the mid-range position of the tare structure 14.

A zero scale positioning spring 46 is suspended from a bracket 50 resting on support frame 12. Spring 46 is connected to weighing frame 16 at a post 48 which extends laterally from plate 17. The stationary anchor point 52 of spring 46 is a vertically movable stud 54 extending through bracket 50 for threaded connection to a nut 56 whose rotation determines the spring initial tension applied by 46 on tare structure 14.

A generally horizontally inclined spring 58 is anchored to weighing frame 16 at stud 60 and anchored to support frame 12 through a bracket 62. Spring 58 controls the maximum or full load scale position with an adjustment of its anchor point 63 along a curved surface 64 in a slot 66 of bracket 62. As will be further explained, surface 64 is shaped in a predetermined manner to vary both the angle of inclination $\alpha$ and the spring length F to establish the desired full load deflection position of tare structure 14.

Figure 2:
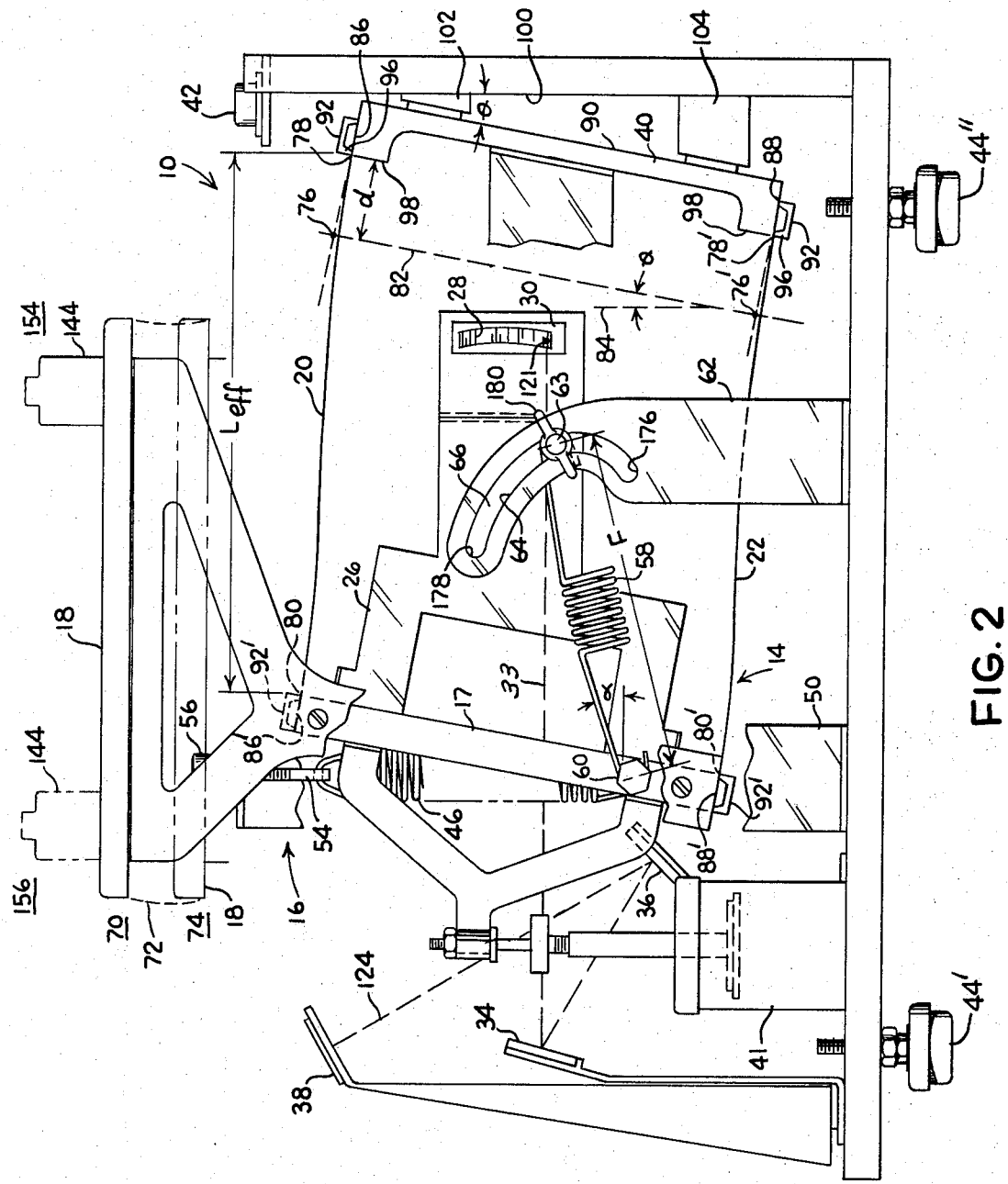
FIG. 2 is a side view in elevation of the leaf spring weighing device shown in FIG. 1 with the housing side wall deleted.

As shown in FIG. 2, platform 18 deflects from a zero load position shown in full lines at 70 along a deflection curve 72 to a maximum or full load position shown in dotted lines at 74. The deflection occurs about horizontal bending axes 76–76' located adjacent to leaf springs 20, 22 respectively at their zero load position as shown. Bending axes 76–76' are parallel and are equally spaced from the clamping edges 78–78' of leaf springs 20, 22 by a distance $d$. Distance $d$ is determined by the leaf springs 20, 22 and depends upon their length. Usually $d$ equals about 0.20 times the effective length $L_{eff}$ of leaf springs 20, 22 with $L_{eff}$ being the horizontal distance between clamping edges 78, 80. The bending axes 76–76' are parallel and define a bending plane 82 which is inclined relative to a vertical plane 84 by an angle $\theta$, the tare angle. The radius of curvature of deflection curve 72 is the distance between bending axes 76 and the movable clamping edge 80.

The selection of the tare angle $\theta$ may best be explained with reference to the schematic view of FIG. 3. Springs 20, 22 are shown with a slight sinusoidal shape as is customary for leaf spring scales. The spring rate of tare structure 14 depends upon the horizontal length, $L_{eff}$, of springs 20, 22 whose actual lengths are longer by virtue of their sinusoidal shapes. The spring rate K varies with the effective length $L_{eff}$ according to the equation $K = Ebt^3/L^3_{eff}$ where E is Young's modulus, $b$ is the total lateral width of springs 20, 22 as measured along their bending axes 76–76' and $t$ is the thickness of springs 20, 22.

For a linear scale the spring rate K would remain constant throughout the deflection range 72. The deflection causes a change, $\Delta L$, in the effective length $L_{eff}$ by virtue of the rotation of springs 20, 22 about their axes 76. In order to keep the variation of $L_{eff}$ as small as possible, the tare structure 14 is tipped at a tare angle $\theta$ relative to the horizontal, with $\theta$ being selected to place the zero scale position 70 and maximum scale position 74 at equal distances from horizontal mid-range positions 86–86' of leaf springs 20, 22. With this angle $\theta$, the effective spring length, $L_{eff}$ will undergo the least change over the deflection range 72 of the scale. The reason for maintaining the change in $L_{eff}$ as small as possible is to make the scale less sensitive to off-level supporting conditions.

With reference to FIG. 2, tare structure 14 utilizes leaf springs 20, 22 with an initial inclination, or tare angle $\theta$, relative to a horizontal plane. This tare angle is obtained by providing stationary spring support plate 40 with an upper spring support surface 86 and a parallel lower spring support surface 88, both of which surfaces are precisely perpendicular to a rear mounting surface 90. Leaf springs 20, 22 are clamped to surfaces 86, 88 with soft metal C-shaped clamping bars 92. Bolts such as 94 (shown in FIG. 1) are used to firmly clamp the leaf springs 20, 22 to support plate 40. Since sharply defined edges 78–78' are desired, the front legs 96 are accurately aligned with the front surfaces 98 of support plate. The clamping pressure applied by bars 92 is carefully limited to avoid those stress levels in the leaf springs 20, 22 that would cause undesired hysteresis effects. For this reason, clamping bars 92 are preferably made from a soft metal, such as aluminum, in comparison with the hard steel alloy material of which springs 20, 22 are made. Clamping bars 92 further extend laterally for the entire width of the leaf springs 20, 22 to avoid high stress points in the leaf springs. A similar attachment of leaf springs 20, 22 is made to weighing frame plate 17 with bars 92'.

The leaf springs 20, 22 are sized and selected of a material which exhibits a low hysteresis characteristic and a high endurance level and fatigue level so that the operational stresses can remain well below fatigue levels. The material is also selected so that the thermoelastic coefficient can be controlled to assure that the load deflection curve remains constant with variations in ambient temperature. The selection of the dimensions of leaf springs 20, 22 takes into account such factors as a reasonably large deflection 72 to enable adequate resolution of the scale readings 28. For example, a one inch deflection 72 for a five pound dynamic load weighing range is an acceptable deflection.

The width of the leaf springs 20, 22 is increased and selected to permit the use of an adequately thin leaf-spring stock to achieve the desired dynamic deflection at reasonable and low stress levels.

Stationary spring support plate 40 is mounted to back wall 100 of support frame 12 with a pair of wall mounts 102, 104 which are carefully sized to locate rear mounting surface 90 at the desired tare angle $\theta$ relative to the vertical back wall 100. The bubble level 42 in turn is accurately oriented perpendicular to back wall 100. Hence, when the bubble is centered in circle 106 of bubble mount 42 (see FIG. 4), the upper and lower leaf spring support surfaces 86, 88 are accurately inclined at the tare angle $\theta$ relative to a horizontal plane and the mid-range position of tare structure 14 is at the desired orientation as explained with reference to FIG. 3. Leveling with bubble mount 42 is obtained by adjusting the height of feet 44, 44' and 44'', all of which can be seen in the view of FIG. 7.

Figure 3:
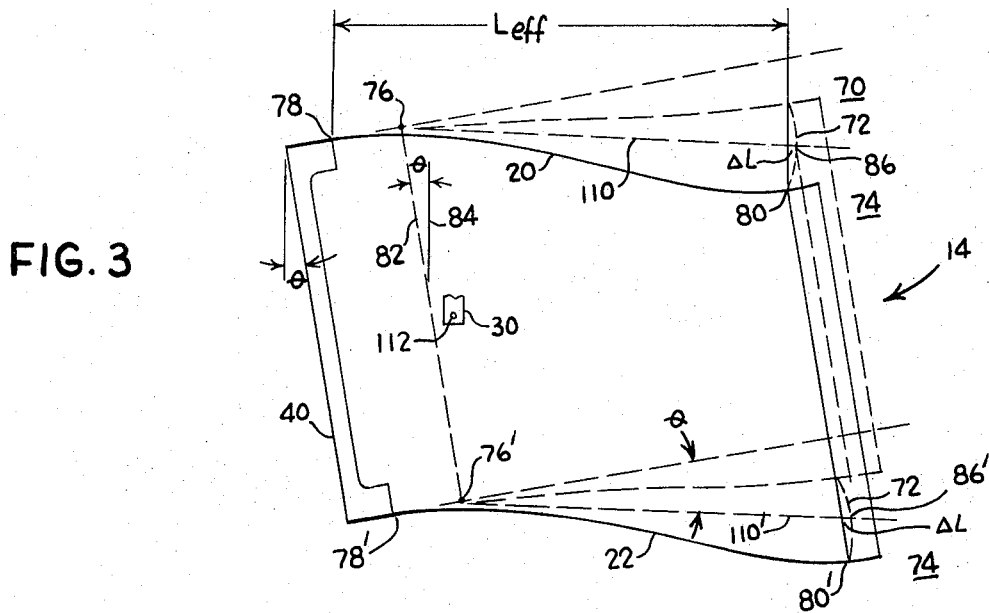
FIG. 3 is a side schematic presentation of the tare structure and its motions in the leaf spring weighing device shown in FIG. 1.

When a load equal to the maximum amount is placed on weighing frame 16, leaf springs 20, 22 deflect about their horizontal bending axes 76 and 76; respectively to maximum load position 74 as shown in FIG. 3. The deflection causes weighing frame 16 to be moved along a curved path 72 while maintaining a fixed orientation. At the mid-range position of the scale, the cantilever ends 80–80' of leaf springs 20, 22 pass through horizontal planes 110–110' which substantially include horizontal bending axes 76–76'. Since weighing frame 16 allows a curved deflection path 72, its scale indicator 26 carries scale indicia 28 as shown in FIG. 2 along a complementary inverse curve which compensates for the deflection path 72. This compensation of the position of scale indicia 28 permits the use of a stationary optical read-out 32 (FIG. 1) to display magnified scale readings.

Figure 6:
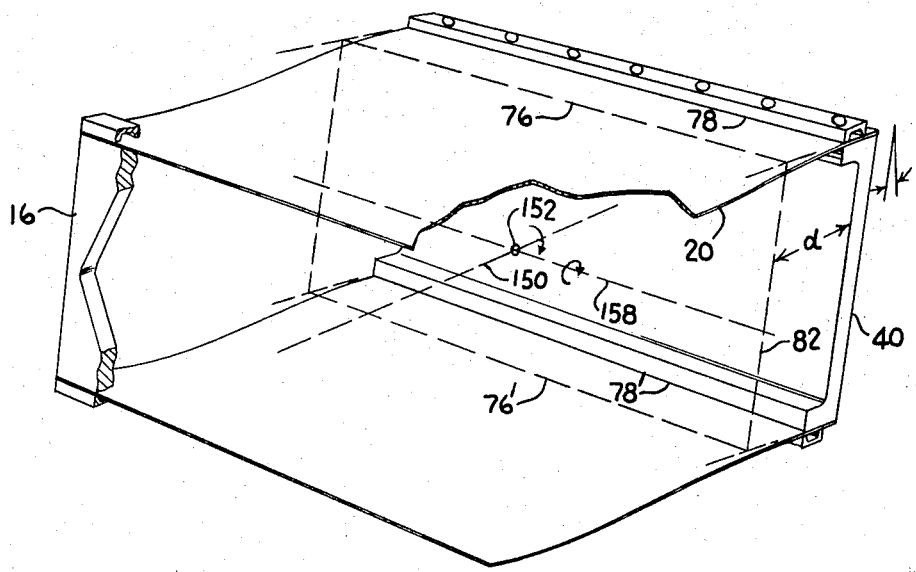
FIG. 6 is a perspective schematic representation of the tare structure employed in the weighing device shown in FIG. 1.
Figure 4:
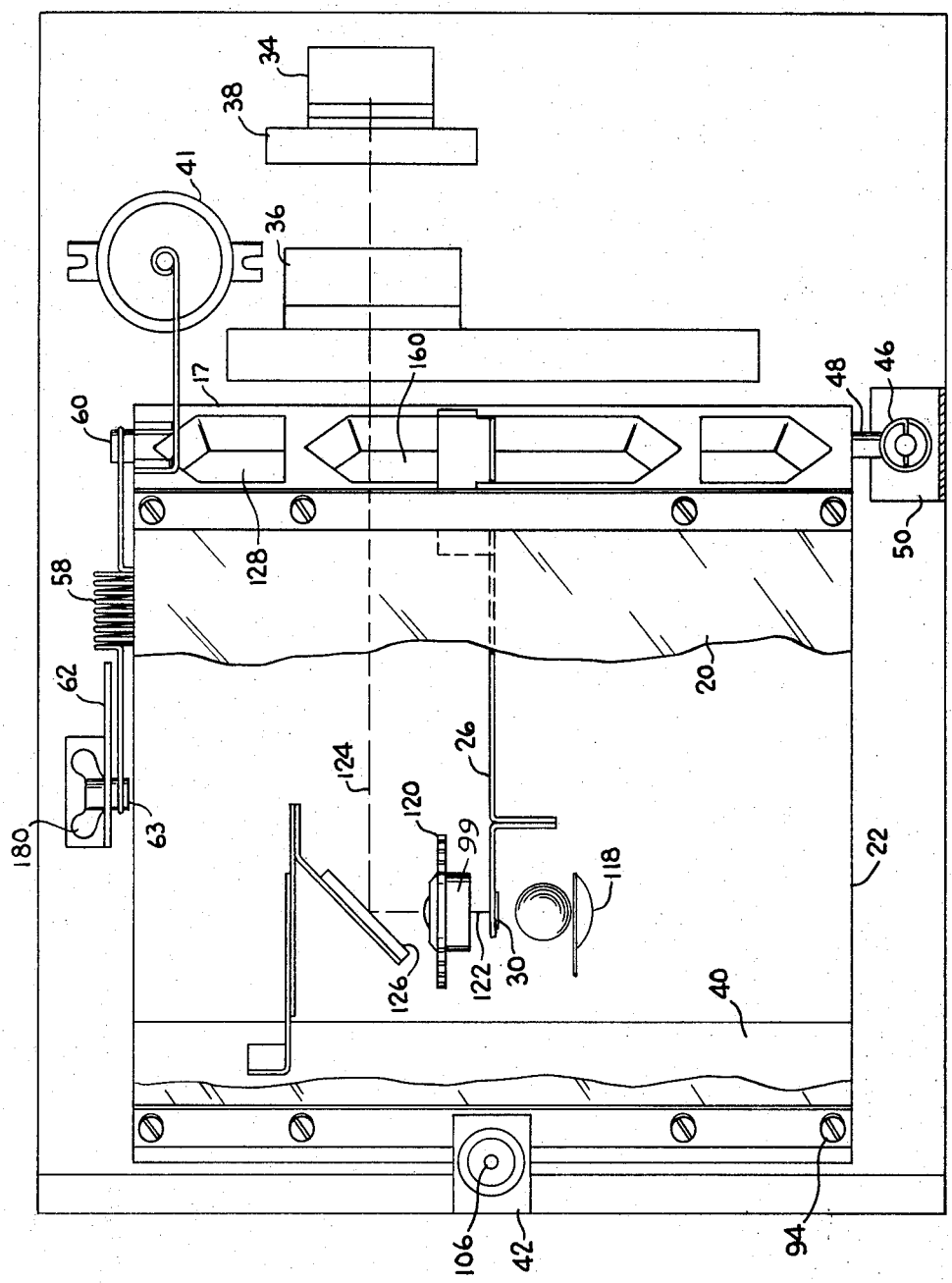
FIG. 4 is a partially broken away plan view of the weighing device shown in FIG. 1.
Figure 5:
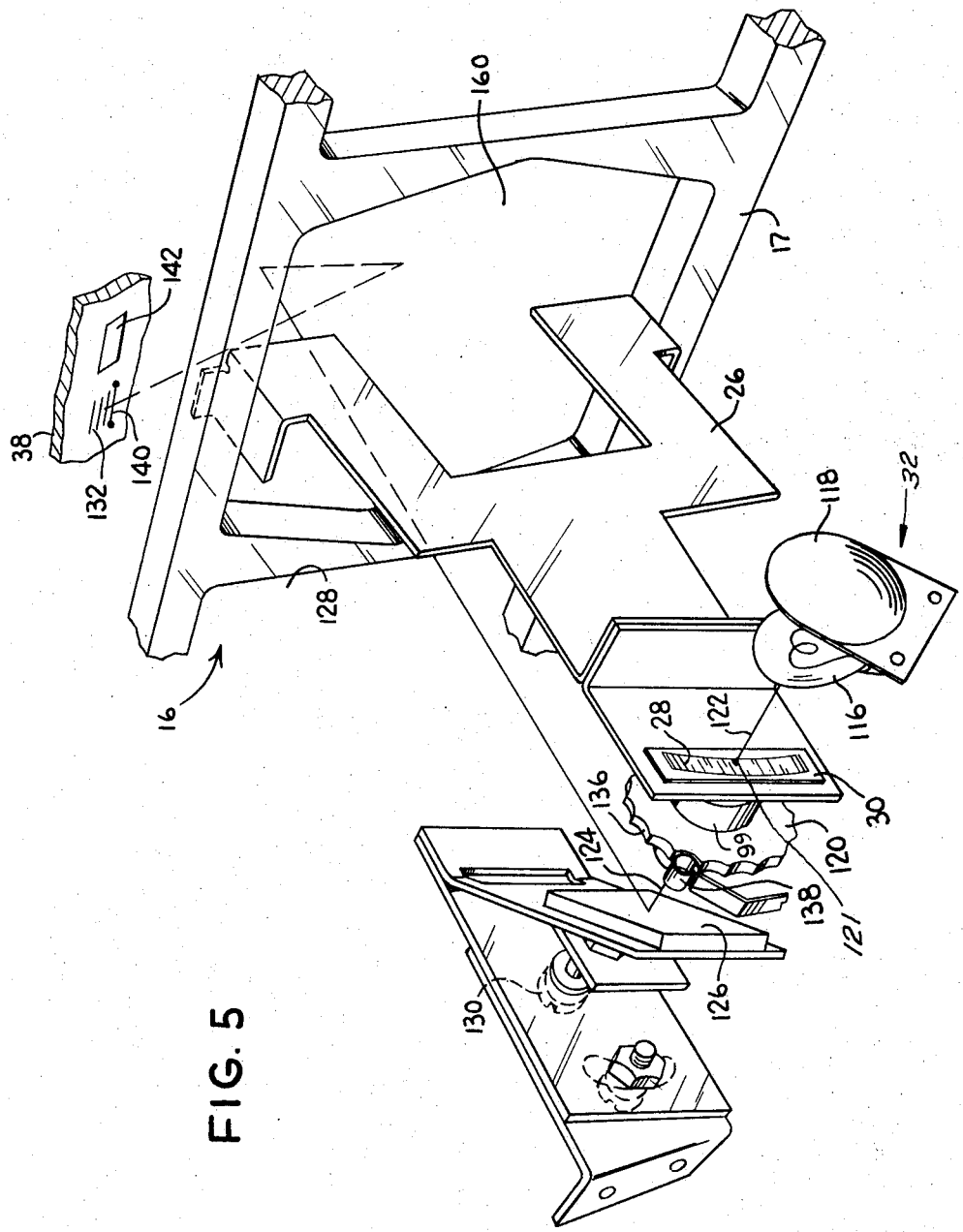
FIG. 5 is a perspective exploded view of an optical system employed to read-out the deflections of the weighing device shown in FIG. 1.

The reticle 30 of scale indicator 26 (FIG. 6) is so located that scale indicia 28 pass through a small sensor point 121 generally located in the vicinity of the leaf spring determined bending plane 82 (FIG. 6) and about midway between bending axes 76–76'. The optical read-out 32 has its optical axis 122 aligned with sensor point 121 and substantially transverse to the plane of transparent reticle 30. The optical elements include as shown in FIGS. 4 and 5 a source of light 116 with a reflector 118 to direct most of the light onto reticle 30. An adjustable focusing lens 120 having an optic axis 122 directs a light beam 124 of indicia 28 onto a 45° mirror 126 which reflects the light beam through opening 160 in weighing frame 16 for display on translucent screen 38 after reflections by mirrors 34 and 36 (shown in FIG. 2). Mirror 126 is adjustable with a screw 130 to laterally align the scale indicia on screen 38. The focusing lens 99 produces a magnified image 132 on screen 38 and is mounted for movement along its optic axis 122 by rotation of lens holder 120 between detent positions such as 136 with a detent element 138.

The magnification of reticle indicia 28 is sufficiently great to present an easily readable display on screen 38 with the aid of a reference hairline 140. Reticle 30 may, in addition to the scale indica 28, be provided with an optical code which may be conveniently detected with photosensors 142 located in the plane of screen 38. The resolution of the scale indicia 28 is sufficiently high to enable one to easily measure load weights of one-sixteenth of an ounce over a full scale dynamic range of five pounds.

The locations of the scale deflection indicator 26 and the optical read-out of reticle 30 are particularly selected to minimize the effects of load shifts on platform 18 (see FIG. 2).

Figure 7:
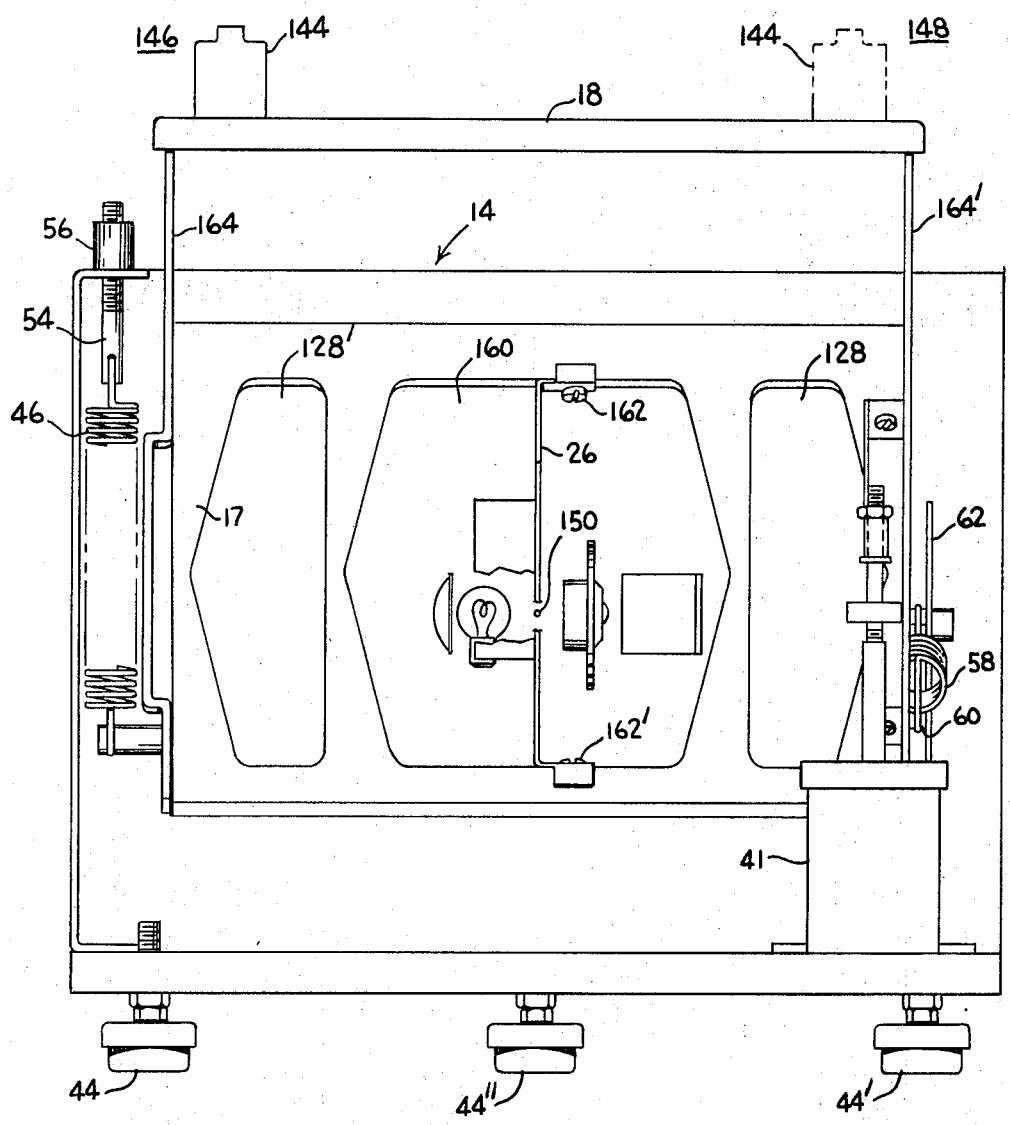
FIG. 7 is a partially broken away front view of the weighing device shown in FIG. 1.

For example, when a load 144 is moved as shown in FIG. 7 from lateral side 146 to side 148, a small clockwise rotation of t are structure 14 arises about a lateral shift axis 150 which lies generally in a horizontal plane about midway between leaf springs 20, 22 and their bending axes 76–76' (see FIG. 6) and midway between the lateral ends of leaf springs 20, 22. This lateral shift axis 150 generally intersects the leaf spring bending plane 82 in a central point 152 which lies about midway between leaf spring bending axes 76–76' and is coincident with sensor point 121.

Another tare structure rotation arises from longitudinal load shifts, such as from the back side 154 to the front side 156 as shown in FIG. 2. This front to aft load shift causes a tare structure rotation about a longitudinal axis 158 (see FIG. 6) which is generally horizontal and located in the vicinity of the leaf spring determined bending plane 82. The longitudinal shift axis 150 and lateral shift axis pass near each other as suggested by intersection point 152.

The weighing device 10 in accordance with the invention is made substantially insensitive to various load shifts by locating the reticle 30 (FIG. 5) in a vertical plane which includes the lateral shift axis 150 so that indicia 28 pass through the intersection point 152 during normal scale deflections. The optical sensor axis 122 (FIG. 5) has been selected to lie substantially coincident with the longitudinal shift axis 158 (FIG. 6) and is focused on the intersection point 152 through which reticle 30 is passed. In this manner any rotations of the tare structure 14 caused by load shifts will have a minimum effect upon scale deflection indications displayed by optical read-out 32 on screen 38.

Although the placement of the scale deflection indicator 26 reduces sensitivities to tare structure rotations, further precautions are made by forming a sturdy torsional resistant tare structure. Thus as shown in FIG. 7, the weighing plate 17 is formed of a lightweight laterally wide plate for coextensive connection to leaf springs 20, 22. Plate 17 has enlarged openings such as 160 and 128–128' to reduce the tare weight as well as increase plate rigidity. Scale indicator 26 is shown laterally centered on plate 17 in aperture 160 and is formed of a vertically wide bracket (see FIG. 2) to minimize vertical deflections of reticle 30 caused by indicator 26's own weight. Scale indicator 26 is retained by screws such as 162 (see FIG. 7) to weighing frame 16. Sturdy side brackets such as 164–164' connect platform 18 to plate 17. Springs 46 and 58 are located on laterally opposite sides of leaf springs 20, 22 to balance the torsional load on the tare structure 14.

The manufacture of the scale components involves a variation of tolerances which can be compensated for with a set of scale adjustments such as bubble level 42, zero load scale positioning spring 46 and full load scale positioning spring 58. When the scale level has been adjusted with the bubble level 42 and feet 44, the zero load position of tare structure 14 is adjusted by rotating nut 56 connected to spring 46 until the hairline 140 on display screen 38 is aligned with the zero scale indication of reticle 30.

The full load or maximum scale deflection position is determined by varying the anchor point 63 of spring 58 along slot 66 of bracket 62 shown in FIG. 2. The curvature of surface 64 is selected to produce both a change in the inclination angle made by spring 58 with the horizontal and the length F or spring rate applied by spring 58.

Figure 8:
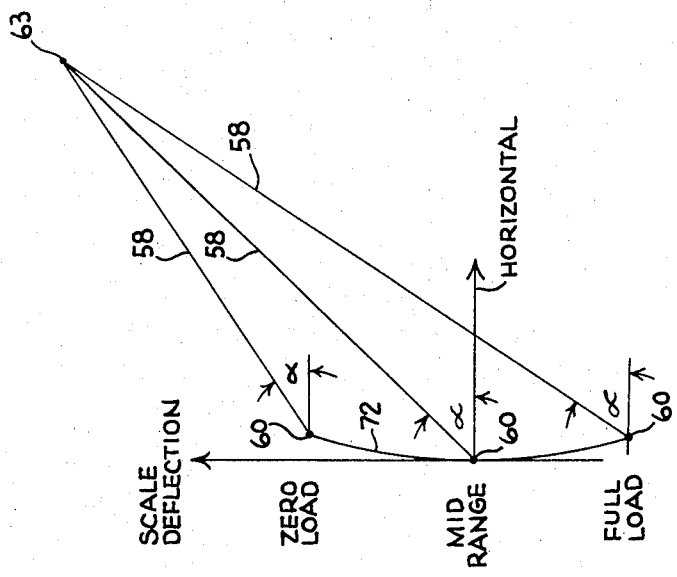
FIG. 8 is a schematic representation of several operational positions of a full load scale position adjusting spring element used in the weighing device shown in FIG. 1.

For any one selected anchor point 63 of spring 58 along slot 66, there exists a non-linear spring rate compensation effect as the weighing frame is deflected over its full range. This non-linearity may be explained with reference to the schematic view in FIG. 8. At zero load as shown in FIG. 2, spring 58 has a length F and is inclined at an angle $\alpha$ with the horizontal. As the scale deflects the anchor point 60 of spring 58 follows a curved path 72 by which both the angle $\alpha$ and the length F of spring 58 are increased. The force applied by spring 58 does not increase in direct proportion with the increased deflection since the force is a function of the non-linear sine function of angle and the length F.

Figure 9:
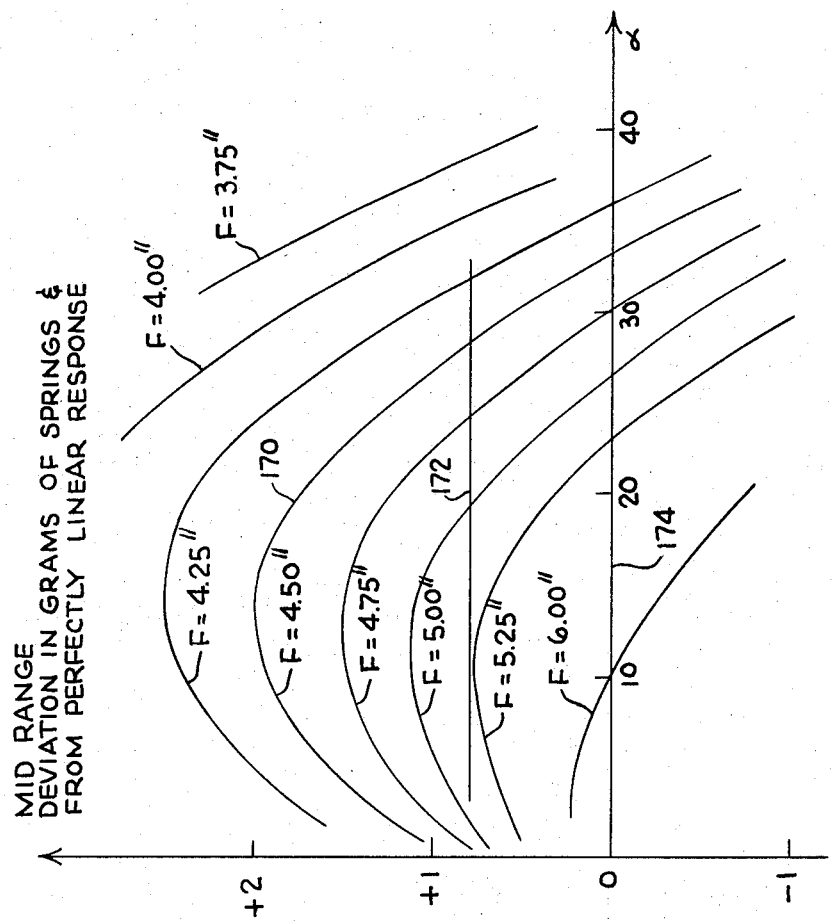
FIG. 9 is a plot of the mid-range deviation of the full load scale position determining spring as a function of its angle of inclination with respect to the horizontal for a family of different spring lengths.

FIG. 9 shows a plot of mid-range deviations introduced by a spring 58 on tare structure 14. For the sake of simplicity, the deviations relative to the mid-range position of the tare structure 14 are plotted as a function of angle $\alpha$ for a family of different lengths F of spring 58. The lengths F refer to the length of spring 58 when tare structure 14 is at its zero load position.

Thus curve 170 for a spring length F of 4.5 inches shows that the mid-range deviation may vary from +2 grams, stiffer, at an angle $\alpha$ of 15° to about minus one-half gram, lighter, at an angle of about 35°. In other words, if one were to use an anchor surface 64 (see FIG. 2) located at a constant radius of 4.5 inches from anchor point 60, spring 58 may introduce mid-range deviations from +2 to minus one-half grams depending upon the final adjustment angle $\alpha$ needed to obtain the desired full load deflection of tare structure 14.

In order to control the mid-range deviation, curved surface 64 is so shaped that the mid-range deviations for all selected angles $\alpha$ lie along a constant value line such as 172 in FIG. 9. This constant value line 172 may be coincident with a zero mid-range deviation line 174; however, for purposes of keeping the length changes of spring 58 within practical limits, a constant mid-range deviation of about 0.8 grams is tolerated so that the length F of spring 58 need not vary excessively. If a mid-range deviation of 0.8 grams is allowed, the length F of spring 58 need not vary more than from about 5.25 inches at an angle $\alpha$ of about 10° to about 4.25 inches at an angle $\alpha$ of about 34°. Since the 0.8 grams spring deviation is controlled, it may be compensated for by the fabrication of the reticle.

The curvature and location of curved anchor surface 64 from anchor point 60 is obtained from the intersection of straight line 172 with the several curves shown in FIG. 9. Slot 66 (see FIG. 2) forms convenient limitations at 176 and 178 for the angle $\alpha$ with which the maximum scale deflection position is adjusted. However, other curved elements may be employed to limit the mid-range deviation of tare structure 14. A wing nut 180 is used to fasten and hold the anchor point 63 of spring 58 once the desired full load scale deflection position has been established.

The adjustment of scale 10 with springs 46 and 58 may involve several repeated sequential adjustments, first of the zero load positioning spring 46, followed by the full load positioning spring 58. These double adjustment points are simple to apply and conveniently carried out at the user's location.

Leaf springs 20, 22 are selected and formed to possess as nearly as possible a constant predetermined spring rate K. Nevertheless, errors in the manufacture and assembly of the springs into the tare structure introduce spring rate variations of as much as about 4 ½ percent from scale to scale. Accordingly, adjustment springs 46 and 58 are so sized and selected to provide sufficient spring rate compensations to maintain the weighing accuracy of each scale within acceptable national and international standards. The combined compensation force from springs 46 and 58 may total about 10 percent of the load being weighed.

The leaf springs 20, 22 are further formed of a low hysteresis hard alloy steel which is heat treated to exhibit the proper temperature behavior of the spring rate K over a temperature range of from 40° to about 110° Fahrenheit.

In one embodiment for a scale 10 in accordance with the invention, a set of leaf springs for a 5 pound dynamic range scale, were employed with each leaf spring having a lateral width $b$, of 9.5 inches ±0.010 inches, a thickness $t$ of 0.01570 inches ±0.00015 inches, an actual length L of 7.500 inches ±0.010 inches and a Young's Modulus E of $27.8 \times 10^6$ ±$0.25 \times 10^6$ lbs/in². The resulting leaf spring bending plate 82 was then a distance $d$ of 1.500 inches from stationary clamping edges 78–78' for an effective spring length $L_{eff}$ of 7.5 inches and a tare angle $\theta$ of 10°. The deflection range of scale 10 was one inch as measured along a vertical plane.

Having thus described a highly accurate leaf spring scale in accordance with the invention, its numerous advantages may be appreciated. The scale is effectively made insensitive to load shifts and environmental variations. Accurate higher range scales may be formed utilizing the features of the scale in accordance with the invention with additional non-contacting parallel leaf springs added to the tare structure.

What is claimed is:

1. An accurate weighing device comprising;
   a tare structure formed of a movable scale weighing frame and a stationary frame with parallel leaf springs connecting the movable and stationary frames;
   said tare structure being selectively mounted to dispose the leaf springs at a predetermined tare angle relative to a horizontal plane to enable the movable scale frame to move with fixed orientation from a no-load scale position to a full-load scale position about horizontal axes located in a leaf-spring determined bending plane, said predetermined tare angle being selected to place the no-load scale and full-load scale positions of the movable frame in a common generally vertical plane;
   a first adjustable spring means connected to the movable frame and anchored to the stationary frame to primarily adjust for deviations in the no-load scale position of the movable weighing frame; and
   a second adjustable spring means connected to the movable weighing frame and adjustably anchored to the stationary frame, said second spring means having a full-load scale position which relates to a preselected length and anchor angle relative to a horizontal plane, said anchor angle and length being selected to primarily adjust for deviations introduced by the movable weighing frame acting between said no-load and said full load scale positions, said second spring means being anchored along a curve designed to yield a length and anchor angle sufficient to produce a constant deviation in a mid-range scale position of said weighing device for all anchor angles on said curve.

2. The weighing device as claimed in claim 1 wherein said second spring means comprises a coil spring having one end connected to the movable weighing frame and its
   other end adjustably anchored along a family of different achor points which are located along a curve by which the effective length of the coil spring and the anchor angle are simultaneously varied in a predetermined manner.

3. The weighing device as claimed in claim 1 and further including
   means for sensing the magnitude of the deflection of the tare structure and producing a signal indicative thereof, said sensing means including
   an optically detectable scale position indicator, said indicator being mounted in a predetermined location relative to the tare structure for a reduced movement of the indicator in response to lateral side to side shifts of a load located on the weighing frame.

4. The weighing device as claimed in claim 3 wherein the optically detectable scale position indicator is located in a generally laterally central plane for reduced movement in response to tare structure rotations due to side to side load shifts.

5. The weighing device as claimed in claim 4 wherein the optically detectable scale position indicator is further generally located in the vicinity of said leaf-spring determined bending plane for a reduced movement of the indicator in response to longitudinal shifts.

6. The weighing device as claimed in claim 5 wherein the first spring means and the second spring means are located on opposite sides of the tare structure for enhanced side to side torsional balance thereof.

7. An accurate load weighing device comprising:
   a support frame;
   a tare structure including a weighing frame and vertically spaced, parallel, generally horizontally mounted leaf springs extending in cantilever fashion from the support frame to deflectably support the weighing frame;
   said leaf spring deflecting about generally horizontal parallel bending axes which define a leaf spring bending plane, said leaf springs having a substantial lateral width as measured along their bending axes;

a tare structure deflection indicator mounted to the weighing frame and located between the vertically spaced leaf springs, said deflection indicator being centrally mounted with respect to the lateral width of the leaf springs for reduced deflection errors produced by tare structure rotations about a lateral shift axis;
   said deflection indicator being further operatively positioned about the leaf bending plane and a longitudinal shift axis about which the tare structure appears to rotate in response to longitudinal load shifts, said deflection indicator including scale indications which are oriented along a curve which is shaped to maintain scale readings about a small sensor point during operative deflection of the tare structure.

8. The accurate load weighing device as claimed in claim 7 wherein the deflection indicator includes optically detectable scale indications mounted for deflection movement past a sensor point, said sensor point being located generally at the intersection of the lateral and longitudinal shift axes.

9. The accurate load weighing device as claimed in claim 8 wherein the deflection indicator further includes a reticle transparency carrying said optically detectable scale indications, said reticle being oriented in a vertical plane which bisects the leaf springs; and
   means for optically detecting said scale indications passing through the sensor point and producing an enlarged display thereof.

10. The accurate load weighing device as claimed in claim 9 wherein said optical detection means further includes a display screen, and means for directing an optical beam at the display screen, said display screen and optical beam being so located to pass the beam between the leaf springs and through the weighing frame onto the display screen.

11. An accurate load weighing device comprising;
    a support frame;
    a tare structure for weighing the load and mounted to the support frame, the tare structure including a weighing frame to support the load and like-sized, vertically spaced and generally parallel mounted leaf springs extending in cantilever fashion from the support frame to deflectably support the weighing frame at cantilevered ends of the leaf springs;

the leaf springs being formed of a material having a low hysteresis characteristic upon deflection of the tare structure, and having a constant deflection characteristic of the tare structure with varying temperature, the deflection of the leaf springs occurring about generally horizontal parallel aligned bending axes which define a leaf spring bending plane, the leaf springs being of substantial lateral width as measured along their bending axes to enable leaf spring stress levels to remain below hysteresis causing levels throughout a load weighing range of the tare structure, said tare structure further including a stationary frame affixed to a wall of the support frame, said stationary frame being affixed to the leaf springs along lateral and parallel supporting surfaces, said supporting surfaces being aligned along a plane which intersects a horizontal plane at said preset tare angle, and means for adjusting the level of the support frame to maintain the preset tare angle;

a tare structure deflection indicator mounted to the weighing frame and located between the vertically spaced leaf springs, said deflection indicator being centrally mounted with respect to the lateral width of the leaf springs for reduced deflection errors produced by lateral load shifts, said deflection indicator further being operatively positioned in the vicinity of the leaf spring bending plane and a longitudinal shift axis about which the tare structure rotates in response to longitudinal load shifts;

the leaf springs being selectively mounted to the support frame to form a preset tare angle relative to a horizontal plane and enable the weighing frame to deflect from a no-load scale position to a full load scale position about the leaf springs bending axes, said preset tare angle being selected to place the no-load and full load scale positions in a common substantially vertical plane;

first variable spring means connected between the weighing frame and the support frame to determined the no-load scale position of the weighing frame;

second variable spring means connected between the weighing frame and the support frame to set the full load scale position of the weighing frame; and means for optically sensing the position of the deflection indicator and producing a signal representative of the weight of a load placed on the weighing frame.

12. The accurate load weighing device as claimed in claim 11 wherein the second variable spring means includes a generally horizontally inclined coil spring anchored to the weighing frame and the support frame at respective anchor points, and means for varying the distance between the anchor points of the coil spring and the effective horizontal inclination of the coil spring to establish the full load scale position of the weighing frame.

13. The accurate load weighing device as claimed in claim 12 wherein the anchor points and inclination variating means further includes a bracket having a spring anchoring surface aligned in a generally vertical plane, the shape of said anchoring surface being formed to establish a family of anchor points selected to cause a predetermined substantially constant mid-range deflection deviation of the weighing frame when the coil spring is anchored at the desired point along the spring anchoring surface.

14. The accurate load weighing device as claimed in claim 12 wherein the first and second spring means are located at opposite lateral sides of the weighing frame for enhanced torsional balance thereof.

15. The accurate load weighing device as claimed in claim 14 wherein the first spring means includes a generally vertically oriented coil spring anchored between the weighing frame and the support frame.

16. The accurate load weighing device as claimed in claim 13 wherein the tare structure further includes clamping bars affixed over the leaf springs at said supporting surfaces to retain the leaf springs, said clamping bars being formed of a softer material than the leaf springs.

17. The accurate load weighing device as claimed in claim 16 wherein the clamping bars are formed of aluminum and the leaf springs are formed of hard steel.

18. The accurate load weighing device as claimed in claim 11 wherein the position sensing means further includes means aligned with a predetermined sensor region directed at the deflection indicator and located in the vicinity of the leaf spring determined bending plane and the longitudinal bending axis for producing an optical beam representative of the deflection of the tare structure, and a display screen located in the path of the beam for display thereof.

19. The accurate load weighing device as claimed in claim 18 wherein the display screen is located in front of the weighing frame away from the leaf spring determined bending plane and said beam is directed between the leaf springs and through the weighing frame onto the display screen along an optical path of sufficient length to form an enlarged display of the deflection of the tare structure.

* * * * *